July 30, 1957     O. J. MURPHY     2,801,050
PULSE SYSTEM PRODUCING NULLS IN ELECTRICAL NETWORKS
Filed Jan. 25, 1954     4 Sheets-Sheet 1
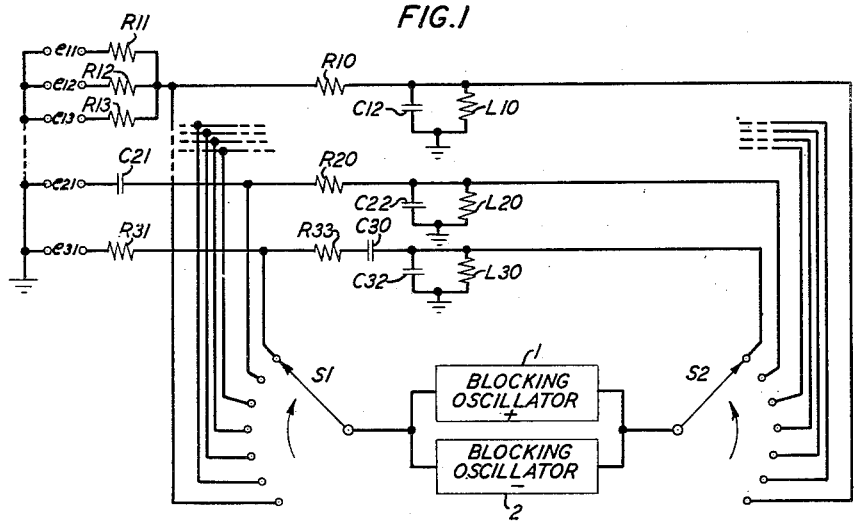
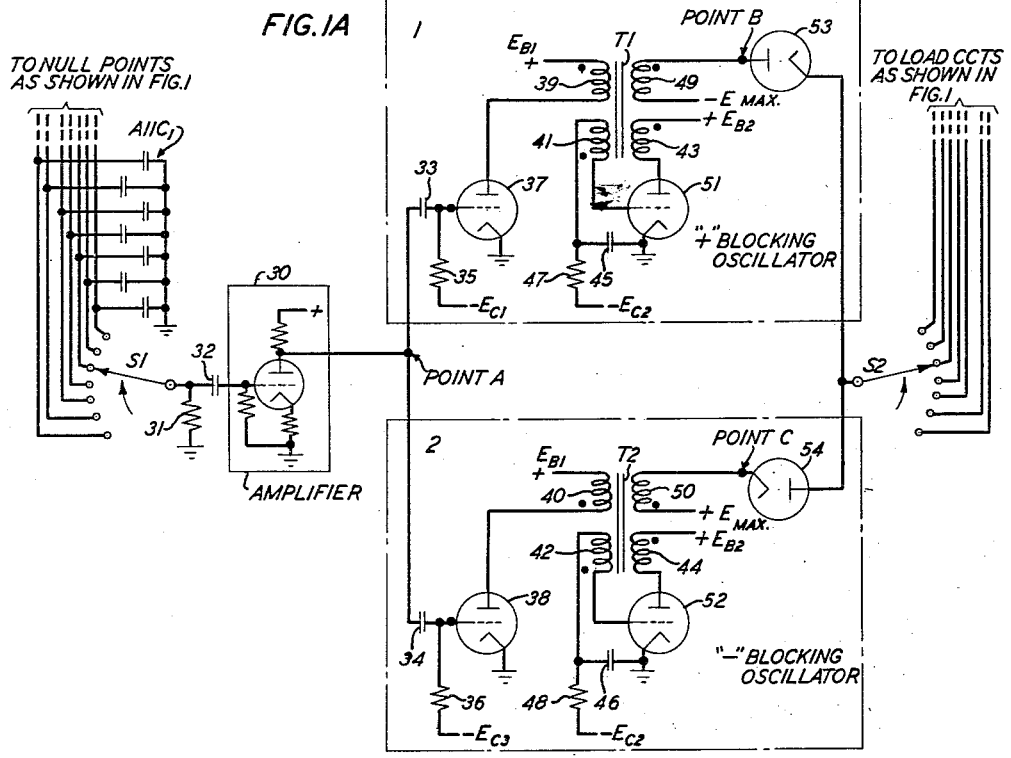
INVENTOR
O. J. MURPHY
BY
G. H. Heydt
ATTORNEY

INVENTOR
O. J. MURPHY
BY
ATTORNEY

July 30, 1957 — O. J. MURPHY — 2,801,050
PULSE SYSTEM PRODUCING NULLS IN ELECTRICAL NETWORKS
Filed Jan. 25, 1954 — 4 Sheets-Sheet 3

INVENTOR
O. J. MURPHY
BY
ATTORNEY

INVENTOR
O. J. MURPHY
BY
G. H. Heyott
ATTORNEY

United States Patent Office 2,801,050
Patented July 30, 1957

2,801,050

PULSE SYSTEM PRODUCING NULLS IN ELECTRICAL NETWORKS

Orlando J. Murphy, New York, N. Y., assignor to Bell Telephone Laboratories, Incorporated, New York, N. Y., a corporation of New York Application January 25, 1954, Serial No. 405,736

5 Claims. (Cl. 235—61)

This invention relates to electrical networks, and particularly to an analog computing system comprising a plurality of computing networks, each conducting direct currents representing mathematical quantities.

The object of the invention is a simplified apparatus for combining direct currents representing mathematical quantities, in which the error in the magnitudes of the combined currents are corrected in discrete steps.

A feature of the invention is a pulsing circuit which is recurrently and successively connected from the null points to the load capacitors of a plurality of computing networks and is energized by an error voltage at a null point exceeding a threshold value to supply a pulse of electricity to the corresponding load capacitor of the proper polarity to reduce the error voltage.

Known analog computing systems may include a plurality of computing networks, each network comprising one, or more, input impedances, a feedback impedance, and a load impedance connected in serial relationship. If the load impedance is reasonably high, a load capacitor may be connected directly across the load impedance; or, if the load impedance is low, the load capacitor may be connected in the input circuit of an electronic device, and the load impedance connected in the output circuit of the device. The load capacitor maintains the flow of current in the load impedance; and maintains a current in the feedback impedance which tends to maintain the potential of the null point at the junction of the input and feedback impedances at a small value. The impedances may be resistive or reactive, or both.

For minimum error in the computing function of the network, the net resultant potential of the null point must be a minimum, as any deviation from zero of this potential is a deviation from perfection in the computing function. In these systems, the potential of the null point may include undesired voltages, such as offset voltages due to contact differences of potential, noise voltages, etc.

In some prior systems, a high gain amplifier is successively and recurrently connected between the null points and the load capacitors of the networks. If the net resultant potential of the null point of a network is not zero, the amplifier is activated to supply to the load capacitor a charge proportional to the potential of the null point and of the proper polarity to reduce the potential of the null point. However, in order to be able to supply charges of either polarity, the output circuit is normally in the center of the operating range, and the power efficiency is thus rather low.

In accordance with the present invention, a normally deenergized pulsing circuit is successively and recurrently connected between the null points and the load capacitors of the networks. If the net resultant potential of the null point of a network exceeds a small, permissible threshold value, the pulsing circuit is energized to supply to the load capacitor a standard pulse of the proper polarity to reduce the potential of the null point. As the pulsing circuit is only energized when a charge is required, the power efficiency is increased. As a large computer system may require a score, or more, of compensating devices, this increase in power efficiency may be a material factor in the success of the computer.

Fig. 1 shows in schematic form a system embodying the invention;

Fig. 1A shows in detail the circuits of the blocking oscillators included in Fig. 1;

Figure 2:
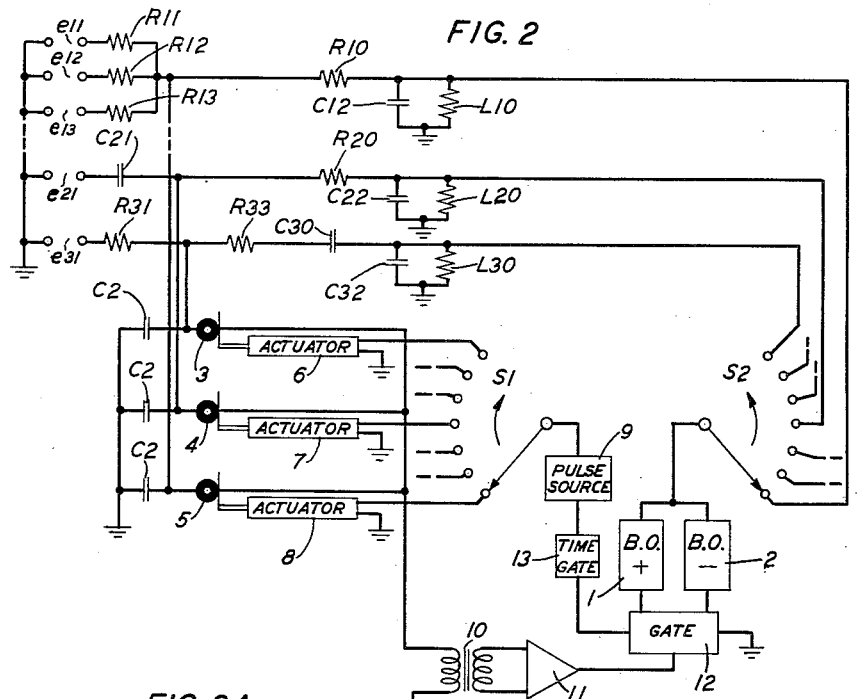
Fig. 2 shows a system generally similar to Fig. 1, with a different type of input circuit.
Figure 3A:
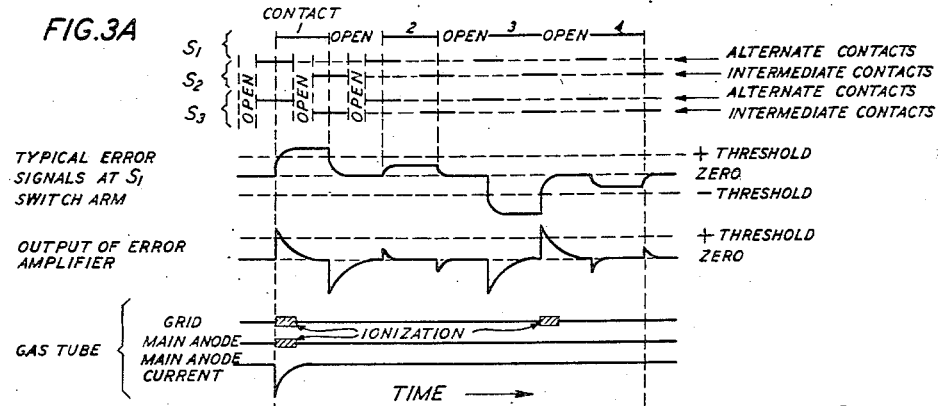
Fig. 3A shows time diagrams relating to the operation of Fig. 3.
Figure 3:
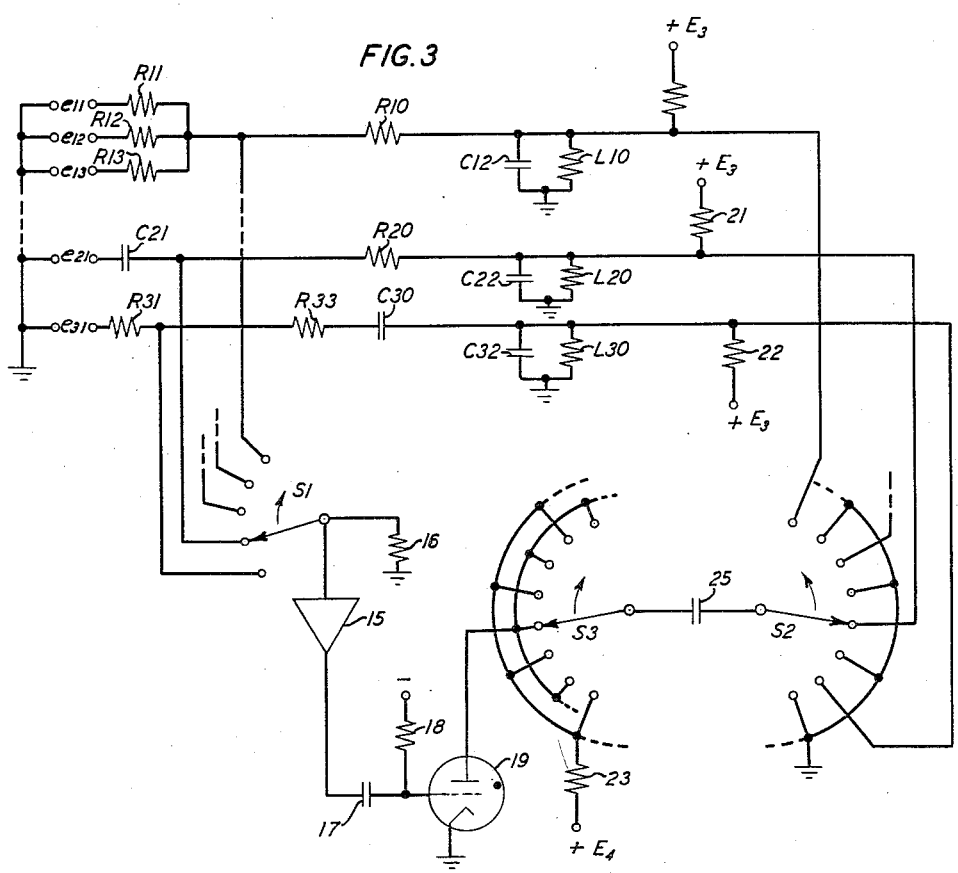
Fig. 3 shows, in schematic form, a system embodying the invention, including a pulsing capacitor.

The computing networks shown in the upper sections of Figs. 1, 2, 3, represent typical networks which may be nulled by a system embodying the invention. As the sets of networks shown in Figs. 1, 2, 3 are similar and have similar reference characters, a detailed description of the networks shown in Fig. 1 will suffice also for Figs. 2, 3.

A plurality of grounded sources of direct voltages $e11$, $e12$, $e13$, respectively representing mathematical quantities, are connected through resistors $R11$, $R12$, $R13$, to a null point which is connected to ground through the feedback resistor $R10$ and the load $L10$. A load capacitor $C12$ is connected across the load $L10$. If the resistors $R10$, $R11$, $R12$, $R13$, have the same resistance and the potential of the null point is reduced to a small value, the potential difference across the load $L10$ will be substantially proportional to the sum of the voltages $e11$, $e12$, $e13$, and the network may be used for addition, subtraction, or comparison. If the resistance of any of the resistors $R11$, $R12$, $R13$, is not equal to the resistance of resistor $R10$, the contribution of the corresponding input to the potential difference across $L10$ will be modified in the ratio of the resistance of $R10$ to the resistance of the input resistor, and the network may thus be used for multiplication, or division, of the inputs to be summed.

The grounded source of direct voltage $e21$, representing a varying mathematical quantity is connected through capacitor $C21$ to a null point which is connected to ground through the feedback resistor $R20$ and the load $L20$. A load capacitor $C22$ is connected across the load $L20$. When the potential of the null point is reduced to, and maintained at, a small value, the potential difference across the load $L20$ will be proportional to the time derivative, or rate of change, of the input voltage. An input circuit of this type may replace one, or more, of the input circuits of the first network.

The grounded source of direct voltage $e31$, is connected through resistor $R31$ to a null point which is connected to ground through the feedback elements comprising resistor $R33$, in series with capacitor $C30$, and the load $L30$. A load capacitor $C32$ is connected across the load $L30$. When the potential of the null point is reduced to, and maintained at, a small value, the potential difference across the load $L30$ will exhibit a rate of change proportional to the value of the input voltage; that is to say the output voltage will be proportional to the time integral of the input voltage. In all of the pulse-correcting schemes shown herein, the resistor $R33$ is necessary where an integration process is to be performed, to avoid coupling the high frequencies, represented by the pulse, back to the null point in too efficient a manner.

The load capacitors C12, C22, C32, maintain the currents in the loads L10, L20, L30, and in the feedback impedances R10, R20, R33 and C30. If this current drain is too high, these load capacitors C12, C22, C32 may respectively be connected in the input circuits of simple amplifiers, having their output circuits connected across the loads.

In Fig. 1, the null points of the networks are respectively connected to the contacts of switch S1, while the ungrounded terminals of the load capacitors C12, C22, C32, are respectively connected to the contacts of switch S2. The switches S1, S2, are synchronously operated by any suitable means (not shown) and, for high speed switching, may be known types of electronic gating devices. For moderate switching speeds, a known type of switch may be used having a plurality of pairs of contacts arranged on the circumferences of concentric circles, a central, constantly rotating shaft, and a rotated crossarm, attached to the shaft and having insulating rollers at each end synchronously operating diametrically opposite pairs of contacts. In using this type of switch, the direction of rotation of switch S2 is reversed, and the order of the connections changed to agree.

The blade of switch S1 is connected to the input circuits of the quiescent blocking oscillators 1, 2, having their output circuits connected to the blade of switch S2. The blocking oscillators 1, 2, are biased to a threshold value, and when energized, respectively deliver a positive, or a negative, pulse to switch S2. If the net resultant potential at a null point, when connected to the blade of switch S1, exceeds the threshold bias, the appropriate oscillator 1 or 2, is energized to deliver a pulse of proper polarity through switch S2 to the corresponding load capacitor to reduce the potential at the null point.

Throughout the scanning interval, during which the blocking oscillators are being successively connected to the other networks, the load capacitor in a network is furnishing current to the associated feedback impedance and to the load. The charge on the capacitor, and the voltage across the load, will decay exponentially during this scanning interval. The accuracy required by the computation, and the maximum rates of change in the input voltages both impose requirements upon the time constant of this decay in the load voltage, and upon the length of the scanning interval.

In some computers, such as gun data computers controlling the weapons firing at an approaching target, the computed quantities may be decreasing. Advantages may be obtained by relating the time constants of the networks to the maximum rate of change of the signal; thus, if the time constant is small enough to make the natural rate of decay of the load voltage approximately equal to the rates of change of the input voltages, few, if any, pulses of opposite polarity from the blocking oscillators will be required to decrease the load voltage.

In the design of a computing system embodying the present invention, the following factors require consideration:

1. The time interval between successive samplings of the residual voltage at the same null point;
2. The magnitude of the threshold voltage;
3. The charge conveyed to the load capacitor by each operation of the pulsing circuit;
4. The requirements imposed on the switching devices, and
5. The time constants of the output networks.

These factors are not independent of each other, and all depend upon the required accuracy of the computation, and upon the nature of the input voltages representing the mathematical quantities.

It is not possible to attain absolute accuracy in any analog computer, and useful results will be attained if the errors in the various components are small enough to bring the over-all error within desired limits. The permissible over-all error will be related to any inherent errors in the input data which are manifested as errors in the amplitudes of the input voltages. For example, the usual radar equipments commonly used to control gun data, and other computers, essentially involve a sampling process having comparatively long sampling intervals; thus, the information supplied by such equipments is only accurate at the time of sampling; and other devices, commonly used in computers, such as potentiometers, may also impress step-like variations upon the amplitudes of the voltages involved in the computations. Consequently, it is not essential that the present system be absolutely accurate; but only that the errors be within permissible limits.

Assume, for example, the computer is used in connectin with the control of the fire from a gun battery and the output voltage of a network represents the range of the target. If the target speed is say 500 yards per second, and the permissible error of a network is 5 yards, the maximum scanning interval should be less than $5/500 = .01$ second.

When the input switch S1 completes a circuit, the error voltage at the null point of the associated network is sampled and an appropriate correction made in the charge on the load capacitor. No more information relating to the conditions in this network is available until the end of the scanning interval, and the subsequent completion of the circuit to the null point. This condition is of the nature of a delay in the receipt of fresh information and may be designated the delay error. The effective delay error will be about half of the scanning interval.

The delay error, as computed above, has been related only to the rate of change of the information supplied to the network, and is based upon the assumption that the charges on the load capacitors have not changed during the scanning interval. However, the charges on the load capacitors are continually decaying, thus producing another error which may be designated the time-constant error.

It is reasonable design philosophy to assign equal magnitudes to the delay error and the time-constant error, and if this is done the scanning interval must be reduced to $2.5/500 = .005$ second to maintain the total error within the assigned limit.

The potential drops across the loads will decay exponentially. Thus $$v = v_0 e^{-\frac{t}{RC}}$$

where $v_0$ is the potential at the start of the scanning interval.

The maximum error will be at maximum range, say, 25,000 yards, thus for an error of 2.5 yards, $$v = v_0\left(1 - \frac{2.5}{25,000}\right)$$

and $$e^{-\frac{t}{RC}} = 1 - \frac{1}{10^4}$$

hence $$\frac{t}{RC} \doteq 10^{-4}$$

and, as $t = .005$ second, $RC = 50$. If the loads have impedances of 50,000 ohms, then $C = 1,000$ microfarads. While a capacitor of this size would be rather bulky, it would be practical for some purposes.

The capacity values required for the load capacitors may be materially reduced if they are deliberately slightly overcharged for each correction. Let the scale factor or extent of the overcharge be $k$, then the voltages across the capacitors will be $$v = kv_0 e^{-\frac{t}{RC}}$$

The optimum value of $k$ will make the average values $\bar{v}$ of the voltage across the load equal to $v_0$ for the scanning interval $t_1$.

Now $$\bar{v} = \frac{1}{t_1}\int_0^{t_1} v\, dt$$

if we set $\bar{v} = v_0$, then $$k = \frac{\frac{t_1}{RC}}{\left(1 - e^{-\frac{t_1}{RC}}\right)}$$

Practical values of $k$ will usually be between 1.0 and 1.2. A value of $k$ of 1.2 would produce about 20 percent ripple voltage in the nominally direct-current circuits of the computer, which might begin to be troublesome. Also the overcharging technique requires close control of the ratio of $t_1$, the sampling period, to RC, the time constant of the load circuits, if computing accuracy is to be maintained. Great reductions of capacity value can be realized, however. Assume $k=1.175$, then $$\frac{t_1}{RC} = 0.1$$

and since $t_1 = .005$, then $RC = .05$; assuming $R = 50,000$; then $C = 1$ microfarad. Capacitors of this size are readily available.

The magnitude of the threshold voltage should not exceed the maximum time rate of change of the resultant of the input voltages multiplied by the scanning interval.

Figure 4:
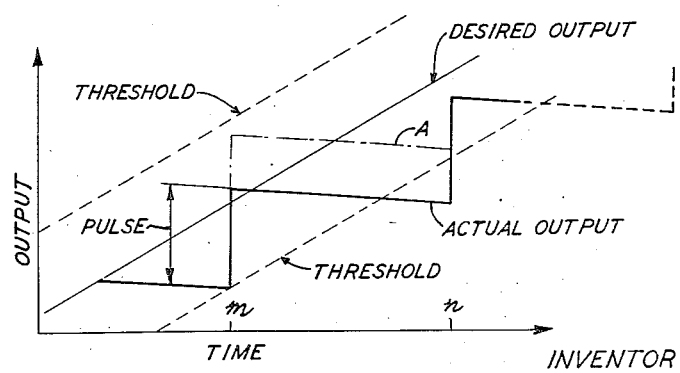
Fig. 4 shows diagrammatically the output relationships in systems embodying the invention.

In Fig. 4, the desired output is plotted against time, with the threshold limits shown by dotted lines. The output voltage across the load was initially at the desired value and has decreased to the lower threshold value. At time $m$ the circuit energized and a charge was supplied to the capacitor which raises the output slightly above the desired output. The output voltage again decreases below the threshold until, at time $n$, the circuit is again energized. If at time $m$, the capacitor is overcharged, as indicated by the chain dotted line, A, then at time $n$ no correction would be required.

In Fig. 1A, the input switch S1 is grounded through resistor 31, and connected through a small capacitor 32, to the input circuit of an amplifier 30.

The amplifier symbolically represented within the rectangle 30 should have a high gain, say 60 to 80 decibels, and good high frequency response up to, say, 100 kilocycles per second, or higher. The small capacitor 32 produces a quasi-differentiation, with respect to time, of the signal from the switch S1, and this effect may be accentuated by designing the interstage couplings, and other elements, of the amplifier, by known methods to reduce the low frequency transmission.

Figure 1B:
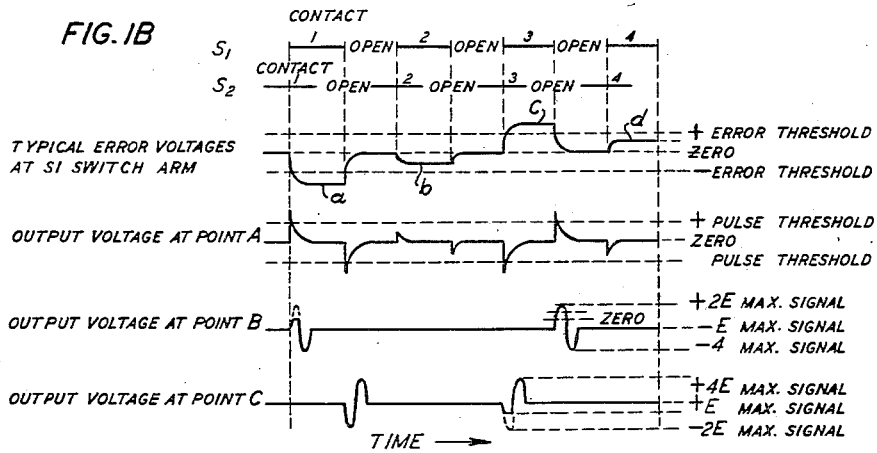
Fig. 1B shows time diagrams relating to the operation of Figs. 1 and 1A.

The first line of Fig. 1B schematically shows the time intervals during which the switch S1 is closed to connect the correcting circuit respectively to the nodes, or junction points, of the networks 1, 2, 3, 4. For convenience of illustration, the closed time intervals of this switch are shown equal to the open time intervals, but other ratios of these intervals may be used. The second line of Fig. 1B similarly shows the closed and open time intervals of the switch S2. This switch is arranged to close before switch S1 closes; and to open before switch S1 opens.

The third line of Fig. 1B schematically shows typical error voltages which may be supplied by the computing networks, through switch S1, to the compensating circuit. When the first contact of switch S1 is closed, the network connected thereto is shown supplying a negative voltage $a$ exceeding the error threshold voltage; when this contact opens the voltage drops to zero. When the second contact of switch S1 is closed, the network connected thereto is shown supplying a negative voltage $b$ less than the threshold voltage. Similarly, the networks connected to 3, 4, are shown supplying positive voltages $c$, $d$, respectively larger than, and less than, the error threshold voltage. The sequence of voltages shown in the third line of Fig. 1B is merely for the purpose of explanation; as it is evident that any network, when sampled, may supply to switch S1 any one of the four types of error voltages.

For simplicity of illustration, the amplifier 30 has been shown producing a phase inversion, but such phase inversion is not essential; as subsequently explained a non-phase inverting amplifier may be used, if desired.

When the switch S1 makes an electrical connection with one of its contacts, the error voltage from the network connected thereto produces a rapid change of voltage which is amplified and inverted in phase. Although the error voltage soon attains a steady value, the output voltage of the amplifier 30 decreases toward zero, due to the poor low frequency response of the amplifier, thus producing a spike-type output voltage. Similarly, when the switch S1 opens the contact, the applied voltage decreases to zero, producing a spike-type of output voltage, of polarity opposite to the polarity of the first spike. The fourth line of Fig. 1B schematically shows the spikes of output voltage at point A produced by the four types of error voltages.

Point A in the output circuit of amplifier 30, Fig. 1A, is respectively connected, through capacitors 33, 34 to the control grids of tubes 37, 38. The control grids of tubes 37, 38 are respectively connected, through resistors 35, 36 to sources of biasing potential $-E_{c1}$, $-E_{c2}$. If the amplifier 30 reverses the polarity of the input voltages, tube 37 is biased to a small value of anode current, and tube 38 is biased to a large value of anode current; whereas, if amplifier 30 does not reverse the polarity of the input voltages, tube 37 is biased to a large, and tube 38 to a small, value of anode current.

The cathodes of tubes 37, 38 are grounded; the anode of tube 37 is connected through winding 39, of transformer T1, to a grounded anode supply $E_{B1}$; the anode of tube 38 is similarly connected through winding 40 of transformer T2 to the supply $E_{B1}$. The direction of current flow in winding 40 is reversed with respect to the direction of current flow in winding 39.

The windings 41, 43 of transformer T1, with capacitor 45 and resistor 47, are connected to tube 51 to form a conventional quiescent blocking oscillator; similarly the windings 42, 44, of transformer T2, with capacitor 46 and resistor 48, are connected to tube 52 to form a conventional quiescent blocking oscillator. The output winding 50 of transformer T2 is connected in the reverse direction with respect to the connection of the output winding 49 of transformer T1.

As tube 37 is biased substantially to cut-off, a spike of negative voltage supplied through capacitor 33 will tend to make the control grid more negative and will have little effect upon the anode current. A spike of positive voltage supplied through capacitor 33 will decrease the bias on the control electrode of tube 37 and will thus cause the anode current to increase. If the anode current increases beyond a critical value, the tube 51 will oscillate, and produce a cycle of voltage in the output winding 49. This critical value of anode current forms an amplitude threshold in the system, thus, the gain of amplifier 30, and the voltages $E_{B1}$, $-E_{c1}$, $-E_{c2}$, should be chosen, or adjusted, so that an error signal of the desired threshold amplitude at the null point will be just capable of causing tube 51 to oscillate.

Tube 38 is biased so that, in the quiescent condition, a large anode current flows. A spike of positive voltage applied to capacitor 34 may slightly increase the anode current, but, due to the connections of winding 40, this increase in anode current will not cause tube 52 to oscillate.

A spike of negative voltage applied to capacitor 34 will reduce the anode current of tube 38, and this reduction of anode current, if sufficiently large, will cause tube 52 to oscillate and produce a cycle of voltage in the output winding 50. The critical value of decrease in the anode current of tube 38 forms a threshold value in the system, which, by suitable selection, or adjustment, of the circuit parameters, may be made to correspond with a desired value of the error voltage at the null point of the network.

The impedances of the windings 49, 50, are comparatively low, thus, when switch S2 connects to one of the load capacitors, if the error voltage of the network is small, the load capacitor would discharge through these windings. To prevent such discharges, asymmetrically conductive devices, such as the diodes 53, 54, are respectively connected between the windings 49, 50, and the switch S2. These devices are poled to pass the first half cycles of the currents from windings 49, 50. In all electrical analog computers, the maximum values which the voltages, representing quantities entering into the computations, can assume is limited by design conditions; thus, the maximum voltages to which the load capacitors C12, C22, C32, Fig. 1, can be charged during operation will be $+E_{max}$, or $-E_{max}$. The free end of winding 49, Fig. 1B, is connected to a source of voltage $-E_{max}$, and the free end of winding 50 is connected to a source of voltage $+E_{max}$, thus, the load capacitors cannot discharge through the devices 53, 54.

In a system of the present type, the charge conveyed to a load capacitor during correction depends upon the difference between the output voltage of the oscillator and the voltage across the capacitor. The voltage across the load capacitor will depend upon the problem in process of solution, thus, the charges conveyed to the capacitors during correction will not be exactly constant. However, if the output voltage of the oscillator is considerably greater than the voltage across the capacitor, the variation in voltage across the capacitor is relatively unimportant and the charges conveyed to the capacitors may be, from a practical point of view, considered to be substantially constant. The windings 49, 50, thus, may be designed to generate open-circuit first half cycle values of voltage, respectively equal to $+3E_{max}$ and $-3E_{max}$. The second half cycles of voltage are blocked by the devices 53, 54.

The operation of Figs. 1 and 1A will be easily understood when considered in connection with the diagrams in Fig. 1B. When switch S1 connects to a contact having a negative error voltage exceeding the threshold voltage, a spike of positive voltage is produced at point A, which energizes the oscillator 51. The voltage of point B rises positively to overcome the bias $-E_{max}$ on the device 53 and the voltage across the load capacitor, and remain ssubstantially constant during the transfer of the charge to the capacitor, except for a slight change in the voltage to compensate for the change in the voltage across the capacitor. The negative half cycle of the voltage from winding 49 is blocked by the device 53. When the switch S1 opens the connection, if the corrective charge has not reduced the error voltage below the threshold, a spike of negative voltage will be produced at point A, and will energize oscillator 52. However, as switch S2 has already broken the connection to the load capacitor, the voltage produced at point C cannot change the charge of the load capacitor.

Similarly, if a network supplies to switch S1 an error voltage exceeding the positive threshold, the negative blocking oscillator 52 will be energized to withdraw a charge from the load capacitor of the network; and the subsequent energization of the positive blocking oscillator 51 will be ineffective.

The resistors in the networks, and the capacities to ground of the wiring to switch S1, filter the changes in the error voltages due to the changes in the voltages across the load capacitors. If desired, this filtering action may be increased by connecting the small capacitors C1, Fig. 1A, from the contacts of switch S1 to ground. The time constants of the resulting arrangement should be less than the time interval between successive samplings of a null point.

If the amplifier 30 does not reverse the polarity of the applied signal, the biases on tubes 37, 38, are interchanged, and the connections to windings 39, 40, are reversed.

As the resultant potential at a null point is a small direct voltage, some difficulties may be encountered with spurious voltages due to contact differences of potential and other phenomena associated with the switch S1. Many of these difficulties may be avoided by converting the small direct voltage into an alternating voltage, as shown in Fig. 2. Here the null points are respectively connected at all times to the primary winding of transformer 10 through pressure sensitive devices 3, 4, 5, which may, for example, be carbon microphone buttons. The contacts of switch S1 are connected to ground through actuators 6, 7, 8, which may be electromagnetic or piezoelectric devices of known types, capable, when energized, of exerting pressures on the devices 3, 4, 5.

The secondary winding of transformer 10 is connected through an alternating-current amplifier 11 and a gating device 12 to the blocking oscillators 1, 2. A pulse source 9, which may be an oscillator, or free running multivibrator, synchronized with the movement of switch S1, or which may be only a battery associated with the switch itself, energizes the connected actuator to compress and release the pressure sensitive device to produce a complete cycle of alternating voltage in transformer 10 if there exists a direct-current error voltage at the corresponding null point. The gate 12 is also energized by the pulse source 9 to pass a selected half cycle of the amplified full cycle alternating voltage, either the first or the second, as may be found convenient, but always the same one in point of time sequence. The selected half cycle will be positive-going or negative-going, depending on the polarity of the observed direct-current error, and may be made to energize the appropriate one of the blocking oscillators 1, 2, to correct this error. The operation of the remainder of the system is similar to the operation of the system shown in Fig. 1.

Figure 2A:
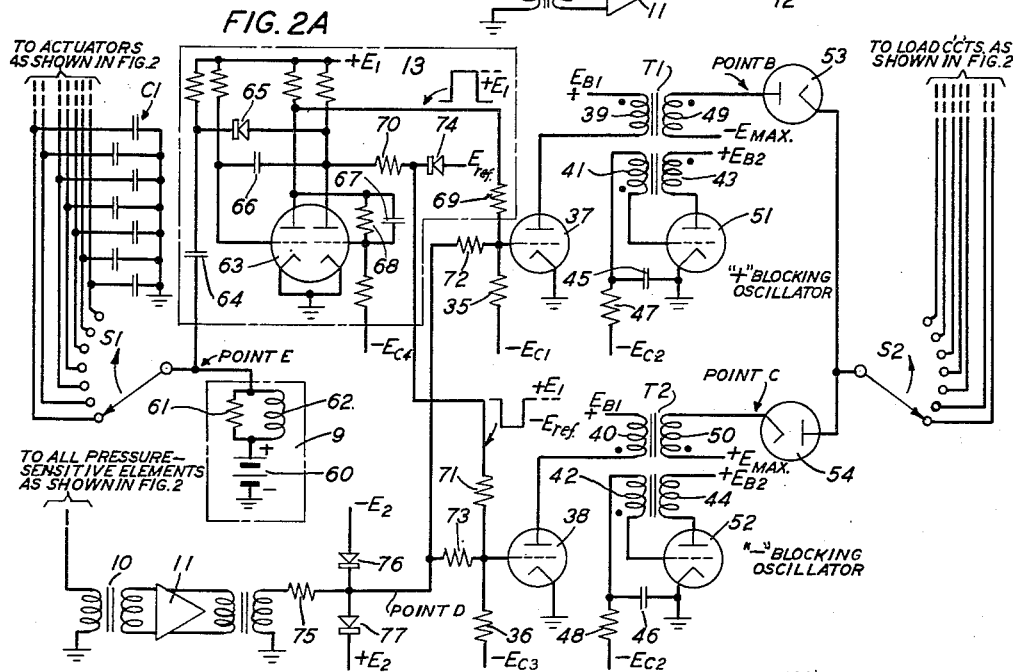
Fig. 2A shows in detail the input circuit and blocking oscillators included in Fig. 2.
Figure 2B:
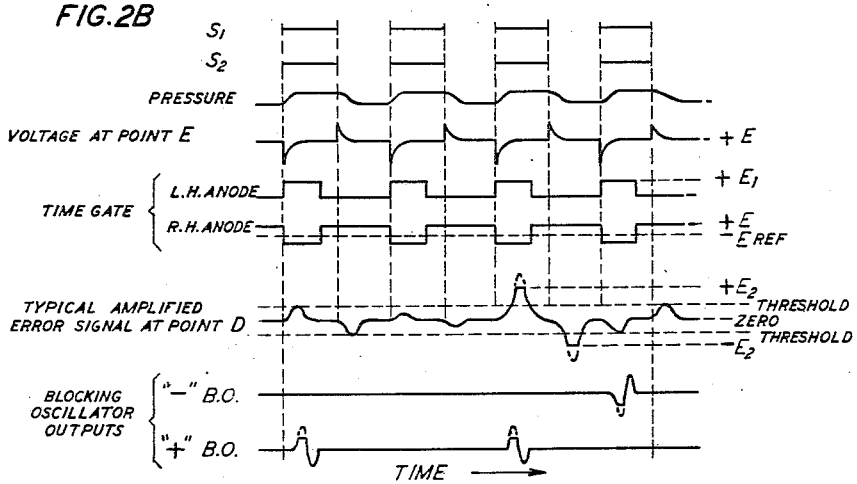
Fig. 2B shows time diagrams relating to the operation of Figs. 2 and 2A.

As shown in the first two lines of Fig. 2B, the switches S1, S2, Fig. 2A, close and open their contacts at substantially the same time.

A source of voltage 60 is connected through resistor 61 and inductor 62 to the common contactor of switch S1. When switch S1 connects to a contact, current from the source 60 flows through resistor 61 and inductor 62 and through the actuator connected to the contact, energizing the actuator to increase the pressure on the pressure sensitive element; when the switch S1 breaks the connection, the actuator is deenergized and the pressure on the element relaxed. The time functions of the pressure increases and relaxations of the successive elements will depend upon the dynamic properties of the actuators; a typical succession of functions is shown in line 3 of Fig. 2B.

The resistance of the inductor 62 is designed to be quite low, and may conveniently be ignored in describing the operation of the circuit. When the switch S1 connects to a contact, substantially all the voltage of source 60 which previously existed at point E disappears owing to the application of the load and the inability of current to instantaneously establish its flow through inductor 62. As the flow of current increases and the magnetic field of the inductor 62 is established, the electromotive force of self-induction disappears, and the voltage at point E rises to substantially the voltage of the source 60. These voltages changes are completed in a small interval of time and have little effect upon the operation of the actuator. When the switch S1 moves off the contact, the inductor 62 discharges through the resistor 61, producing a transient rise of voltage at point E, as shown in the fourth line of Fig. 2B. If the actuators are of a type, such as a telephone receiver, having considerable inductive reactance, small capacitors C1 may be connected to the contacts of switch S1 to counteract the effect of the inductive reactance.

The twin triode 63, and associated elements shown in Fig. 2A perform the function of the time gate 13, Fig. 2 and are connected to form a conventional monostable multivibrator. In the stable condition, the left triode conducts full anode current while the right triode is cut off; the anode of the left triode is then at a low potential, while the anode of the right triode is at a potential almost as high as that of the anode source $+E_1$.

The sudden decrease in voltage at point E supplies a spike of negative voltage through capacitor 64, unilaterally conductive device 65 and capacitor 66 to the control grid of the left triode, decreasing the anode current in the triode. The potential of the anode of the left triode rises, supplying a positive voltage through capacitor 67 and resistor 68 to the control grid of the right triode, permitting anode current to flow. The potential of the anode of the right triode falls, applying a negative voltage through capacitor 66 to the control grid of the left triode. This interaction is cumulative, and results in the right triode conducting full current, while the left triode is cut off. The capacitor 66 then slowly charges until a positive voltage is applied to the control grid of the left triode, causing the system to revert to the stable condition. The time constants of the system are selected so that the system will revert to the stable condition before the switch S1 has opened the connection to the network. Lines 6 and 7 show the variations in the anode voltages of the left-hand and the right-hand triodes of the twin triode 63.

Except for changes in the input circuits of the trigger tubes 37, 38, the trigger tubes 37, 38, blocking oscillators 51, 52, and diodes 53, 54, of Fig. 2A, are connected in the same manner as the similar elements in Fig. 1A, similarly numbered elements in the two systems having similar functions.

A source of voltage $-E_{c1}$ is connected by resistor 35 to the control grid of tube 37, and normally biases this grid below the cut-off voltage of the tube. The anode of the left triode of tube 63 is connected through resistor 69 to the control grid of tube 37. When the left triode of tube 63 is cut off, the rise in voltage of the anode of this triode reduces the bias on the control grid of tube 37 substantially to the cut-off value. This change in the bias on the control grid of tube 37 alone is insufficient to energize tube 51.

A source of voltage $-E_{c3}$ is connected through resistor 36 to the control grid of tube 38. The anode of the right triode of tube 63 is connected through resistors 70, 71, to the control grid of tube 38, so that, in the quiescent state, the control grid of tube 38 is biased positively. When tube 63 operates, the decrease in the voltage on the anode of the right triode reduces the bias on the control grid of tube 38 substantially to cathode potential. This change in the bias on the control grid of tube 37 alone is insufficient to energize tube 52. In some cases, the right triode of tube 63, due to aging or other defect, may be incapable of producing sufficient anode current to reduce the anode voltage to a normal degree. To standardize the operation of this part of the circuit, a source of voltage $E_{ref}$, more positive with respect to ground than the anode potential, during conduction, of the poorest tube, is connected through a catching diode 74 to the junction of resistors 70, 71; and resistor 71 is selected so that this voltage will reduce the bias on the control grid of tube 38 substantially to ground potential. The small capacitors $C_2$, Fig. 2, are respectively connected from the null points of the networks to ground, and accumulate charges respectively proportional to the error signals at the null points. The primary winding of transformer 10 is connected through the pressure sensitive elements 3, 4, 5 and associated capacitors $C_2$, to ground. The inductance of this winding is related to the resistances of the elements 3, 4, 5, and the capacitances of the capacitors $C_1$ so that the time constants of these circuits are small compared to the time interval of closure of switch S1. With a steady value of error voltage across a capacitor, when the corresponding actuator is energized to increase the pressure on its pressure sensitive element, the voltage supplied to the input of the amplifier 11 will change with the change in pressure; but, when the pressure becomes constant, due to the short time constants of the circuits, the voltage will drop back to zero.

The trigger tubes 37, 38, should only be operated during the time interval in which they have been conditioned by the time gate 13. To prevent the operation of these tubes by a signal pulse of excessive amplitude, which might override the gate signal, two sources of voltages $-E_2$ and $+E_2$ are respectively connected through diodes 76, 77 and resistor 75 to the output of amplifier 11 to limit the maximum output voltage.

The amplifier 11, and associated transformers, is arranged to reverse the polarity of the applied signal; thus, an error voltage of negative polarity produces a positive pulse at point D, and vice versa.

The operation of the system will be clearly apparent from a consideration of Figs. 2A and 2B, particularly the last three lines of Fig. 2B. On the first closure of switch S1, the network attached thereto supplies a negative error signal which produces a positive pulse at point D, Fig. 2A, equal to, or exceeding, the threshold value. This pulse neutralizes the bias on the control grid of tube 37, energizing tube 51 to supply a positive charge to the load capacitor of the network. The negative half wave of voltage from winding 49 is suppressed by the device 53. When switch S1 opens the contact, the remaining error signal may produce a negative pulse at point D, but, as the time gate 13 has restored, removing the conditioning voltages from the control grids of tubes 37, 38, this negative pulse is ineffective. The network connected to the second contact of switch S1 produces a pulse at point D which is less than the threshold value, thus no corrective action is initiated. The network connected to the third contact of switch S1 has a large negative error signal which tends to produce at point D a positive pulse having a magnitude exceeding the potential of the source $+E_2$. This pulse is clipped by diode 77. The clipped pulse overcomes the bias on tube 37, which energizes tube 51 to supply a corrective charge to the load capacitor of the network. When the switch opens a large negative pulse is produced but is clipped by diode 76 so that its amplitude is limited to the value $-E_2$ which cannot overcome the gate signal from the right-hand side of tube 63 and falsely trigger tube 52. The network connected to the fourth contact of switch S1 has a positive error signal which produces at point D a negative pulse equaling or exceeding the threshold value. This negative pulse increases the bias on tube 38, which energizes tube 52 to supply a negative charge to the load capacitor of the network.

The particular sequence of error signals shown in Fig. 2B is merely illustrative of typical conditions; thus, the present invention is not thereby limited in any way to any particular sequence of error signals.

In Fig. 3, the blade of switch S1 is connected to ground through resistor 16, and through an amplifier 15, and capacitor 17 to the input circuit of a gas-filled triode 19.

The amplifier 15 does not reverse the polarity of the input signal. If desired, this input circuit may be replaced by the input circuit shown in Fig. 2. The control electrode of triode 19 is biased through resistor 18 from a suitable source (not shown).

The charging resistors 20, 21, 22, are connected from suitable sources of positive potential $+E_3$ respectively to the load capacitors C12, C22, C32, and tend to charge these capacitors to the maximum permissible potential. Intermediate contacts of switch S2 are connected to ground, while the alternate contacts are respectively connected to the load capacitors. Corresponding alternate contacts of switch S3 are connected to the anode of triode 19 while the intermediate contacts of this switch are connected through resistor 23 to a source $E_4$ of high potential positive with respect to ground. Switches S1, S2, S3, are synchronously driven by suitable means (not shown); the contacts of switch S1 are spaced so that circuits are completed through the contacts of switch S1 only when the circuits are completed through the alternate contacts of switches S2, S3.

A small capacitor 25 is connected from the blade of switch S2 to the blade of switch S3. When the blades of switches S2, S3, are on the intermediate contacts, capacitor 25 has its right-hand plate grounded and is charged through resistor 23 to make the left-hand plate positive. When the switches S2, S3, move on to the next alternate contacts, if triode 19 is not ionized, the charge on capacitor 25 is unchanged and the voltage at the corresponding load circuit is unaffected by this action. When, however, the switches S2, S3, are on alternate contacts, as shown, and the residual voltage of the null point applied through switch S1 and associated circuits has sufficient amplitude to overcome the threshold biasing voltage on the control grid of triode 19, triode 19 will become ionized and capacitor 25 will discharge through switch S3, triode 19, ground, capacitor C22 and switch S2, reducing the charge on capacitor C22.

The value of capacitor 25 and the voltage of the source connected to resistor 23 are chosen such that the reductions in the charges on the load capacitors are larger than the increments of charge through resistors 20, 21, 22, during the scanning interval; thus, the voltages across the loads are reduced until the resultant potentials at the null points are less than the threshold. After this condition has been attained, the triode 19 will be ionized only at irregular intervals when the potential at one of the null points exceeds the threshold value.

For increasing values of input voltages, the time constants of the charging resistors and load capacitors may be respectively related to the maximum time-rates of change of the resultant input voltages, so that the voltages across the loads will increase roughly as the resultant input voltages increase, and, after the initial adjustment has been completed, the corrective circuit will only operate occasionally for rapidly increasing input signals, roughly half the time for unvarying input voltage and at almost every sampling period for rapidly decreasing input voltages.

The amplifier 15, Fig. 3, may be designed similarly to amplifier 30, Fig. 1A, or may include a signal-shaping network, monostable multivibrator, or other circuit elements, such that when a constant signal potential is applied to the input circuit, a spike of voltage of the same polarity will be produced in the output circuit, which rapidly decays to zero.

The operation of Fig. 3 may be considered in conjunction with the graphs of Fig. 3A. Switches S2, S3, respectively connect to alternate contacts connected to the anode of tube 19, and to the load capacitor of a network. Switch S1 then connects to the null point of the same network, and maintains this connection while switches S2, S3, open the connections to the alternate contacts, and close the connections to the intermediate contacts respectively connected to resistor 23 and ground. Switches S2, S3 maintain these connections until after switch S1 has opened the connection to the null point, and then open the connections to the intermediate contacts.

The source $+E_4$ has a positive potential with respect to ground exceeding the potentials of the sources $E_3$. A positive error signal applied to the input circuit of amplifier 15 will produce a spike of positive voltage which is applied through capacitor 17 to the input circuit of tube 19. If this spike of voltage exceeds the threshold value, tube 19 will be ionized. As the potential of the source $E_4$ exceeds the voltage across the load capacitor, the anode of tube 19 is positive with respect to ground and anode-cathode current will flow, reducing the charge on the load capacitor. When switch S1 breaks its connection, a spike of negative voltage will be supplied to the input circuit of tube 19, but this spike of voltage will not have any corrective action.

Error signals, of either polarity, which supply to the input circuit of tube 19 voltages having magnitudes less than the threshold value will not initiate any change in tube 19.

When switch S1 connects to a network having a negative error signal, a negative pulse will be supplied to the input circuit of tube 19, but this pulse will not ionize tube 19. However, current will flow from source $E_3$, through the appropriate charging resistor, to the load capacitor of the network, thus, reducing the error voltage. When switch S1 opens the connection, a positive pulse may be supplied to the input circuit of tube 19, and this pulse may produce ionization between the control electrode and the cathode; but, as switch S3 has opened the circuit to the anode of tube 19, the anode-cathode path of tube 19 will not be ionized.

The circuits shown in Figs. 1 and 2 thus will automatically tend to track decreasing input voltages with the minimum of correction; while the circuit shown in Fig. 3 will automatically tend to track increasing input voltages with a minimum of action from the corrective circuit.

What is claimed is:

1. In a computing system including a plurality of computing networks, each network including an input impedance adapted to be connected to a grounded source of a voltage, a grounded load capacitor connected across the load, a feedback impedance connected from the free end of the input impedance to the ungrounded terminal of the capacitor, and switching means having an input contactor successively and recurrently sampling the voltages at the junctions of the input and feedback impedances and an output contactor synchronously contacting the junction of the feedback impedance and the capacitor, the improvement which comprises a source of biasing voltage, and an electrical pulsing circuit connected to said contactors and said source of biasing voltage and energized by the presence of a voltage at the input contactor exceeding the value required to overcome the bias voltage to supply a pulse of electrical current to the capacitor to change the charge on the capacitor by a predetermined amount to reduce the voltage at the input contactor.

2. The combination in claim 1 in which the pulsing circuit comprises two blocking oscillators respectively adapted to supply pulses of electrical voltage of invariable magnitude but opposite polarity.

3. The combination in claim 2 with a transformer having primary and secondary windings, pressure sensitive resistors respectively connected from the junctions of the input and feedback impedances to the primary winding, electromechanical actuators respectively connected to the input contactor and individually operatively associated with said resistors, an electrical gating device connected to said blocking oscillators, an amplifier connecting said secondary winding and said gating device, and a pulse source connected to said input contactor and said gating device.

4. The combination in claim 1 with charging circuits for the load capacitors, and a pulsing circuit comprising a pulsing capacitor, a charging circuit for said pulsing capacitor, and switching means for disconnecting said pulsing capacitor from the charging circuit and connecting the pulsing capacitor to discharge a pulse of electrical current of invariable magnitude to the load capacitor.

5. In combination, a plurality of electrical networks, each network including an input impedance adapted to be connected to a grounded source of voltage, a grounded load impedance, a feedback impedance connecting the free ends of the input and load impedances, an output capacitor connected across the load impedance and a charging resistor adapted to be connected from the free end of the load impedance to a source of charging current, an input switch including a movable contactor and stationary contacts successively connected to the junctions of the input and feedback impedances, an output switch including a movable contactor and stationary contacts, alternate stationary contacts being successively connected to the junctions of the feedback and load impedances, and intermediate stationary contacts being connected together, a third switch connected between said input switch and said output switch, said third switch including a movable contactor and stationary contacts, alternate stationary contacts being connected together and corresponding intermediate stationary contacts being connected together, a pulsing capacitor connected from the contactor of the third switch to the contactor of the output switch, a charging circuit for said pulsing capacitor connected from the intermediate contacts of said third switch to the intermediate contacts of said output switch, a gas-filled triode having a control electrode connected to the movable contactor of said input switch and an anode connected to the alternate contacts of said third switch, and means for biasing said control electrode, said movable contactors being synchronously driven so that the contacts of the input switch and the alternate contacts of the other switches are closed simultaneously, whereby when the voltage supplied through the input switch to the control electrode exceeds the biasing voltage said triode is ionized to discharge said pulsing capacitor through the associated load capacitor to reduce the voltage supplied through the input switch.

No references cited.